United States Patent
Malik et al.

(10) Patent No.: US 6,279,126 B1
(45) Date of Patent: Aug. 21, 2001

(54) METHOD FOR VERIFYING THAT A PROCESSOR IS EXECUTING INSTRUCTIONS IN A PROPER ENDIAN MODE WHEN THE ENDIAN MODE IS CHANGED DYNAMICALLY

(75) Inventors: Vishal Malik, Sunnyvale; Alejandro Quiroz, San Jose; Martin J. Whittaker; James M. Hull, both of Cupertino; Michael R. Morrell, Mountain View, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/183,572

(22) Filed: Oct. 30, 1998

(51) Int. Cl.$^7$ ............................. G06F 11/26; G06F 11/28
(52) U.S. Cl. .................................. 714/38; 712/43
(58) Field of Search ............................ 714/38; 712/204, 712/41, 43; 703/23, 28

(56) References Cited

U.S. PATENT DOCUMENTS

| | | |
|---|---|---|
| 3,815,101 * | 6/1974 | Boss et al. . |
| 5,408,664 * | 4/1995 | Zarrin et al. . |
| 5,630,102 * | 5/1997 | Johnson et al. . |
| 5,708,594 * | 1/1998 | Iwashita et al. . |
| 5,828,853 * | 10/1998 | Regal . |

* cited by examiner

Primary Examiner—Gopal C. Ray
(74) Attorney, Agent, or Firm—David A. Plettner

(57) ABSTRACT

A method verifies that a processor is executing instructions in a proper endian mode when the endian mode is changed dynamically. In accordance with the present invention, a test suite written and compiled in big endian mode is loaded into memory. The test suite is converted to little endian mode and stored back to memory. Next, the processor status is changed from big endian mode to little endian mode, and the test suite is executed. Finally, the results of the test suite are examined to ensure that the processor properly executed the instructions in little endian mode.

4 Claims, 3 Drawing Sheets

10

15

20

25

30

35

40

45

50

55

60

65

METHOD FOR VERIFYING THAT A PROCESSOR IS EXECUTING INSTRUCTIONS IN A PROPER ENDIAN MODE WHEN THE ENDIAN MODE IS CHANGED DYNAMICALLY

REFERENCE TO A COMPUTER PROGRAM LISTING APPENDIX

Incorporated herein by reference is a Computer Program Listing Appendix. The Computer Program Listing Appendix is included on two copies of a compact disc in accordance with 37 CFR §1.96(c)(2). Each compact disc is labeled as follow: "Ser. No.: 09/183,572", "Filed: Oct. 30, 1998", "TITLE: Method for Verifying That a Processor Is Executing Instructions in a Proper Endian Mode When the Endian Mode Is Changed Dynamically", "Created: Feb. 13, 2001", "Inventors: Vishal Malik. Alejandro Quiroz, Martin J. Whittaker, James M. Hull, Michael R. Morrell." The first copy is labeled "Copy 1 of 2" and the second copy is labeled "Copy 2 of 2". Each compact disc includes a single file having a filename of "APPENDIX.TXT", which was created on Feb. 13, 2001 at 9:06 AM and has a file size of 53,216 bytes.

FIELD OF THE INVENTION

The present invention relates to a computer program that verifies the proper operation of a processor. More specifically, the present invention relates to a computer program that verifies that instructions are executed in a proper endian mode when the endian mode is changed dynamically.

DESCRIPTION OF THE RELATED ART

Versions 1.1 and 2.0 of the Hewlett-Packard Precision Architecture Reduced Instruction Set Computer (PA-RISC) architecture provide for a an E-bit in the Processor Status Word (PSW) that enables memory references to data and instructions to have either big or little endian byte ordering. The PA-RISC 1.1 and 2.0 Architecture and Instruction Set Reference Manuals are hereby incorporated by reference. When the E-bit is 0, all larger-than-byte loads and stores are big endian, with lower-addressed bytes in memory corresponding to the higher-order bytes of the register into which the memory operand is loaded. When the E-bit is 1, all larger-than-byte loads and stores are little endian, with the lower-addressed bytes in memory corresponding to the lower-order bytes of the register into which the memory operand is loaded. Loads and stores that are only a single byte are not affected by the E-bit. The E-bit also affects instruction fetching.

Historically, computer systems based on the PA-RISC architecture use big endian. One of the primary purposes of the E-bit is to allow data and programs to be easily migrated from a system that uses little endian to a PA-RISC platform. For example, if a customer has a database application written for an Intel® platform, which uses little endian, the customer can easily re-compile the application and data to execute on a PA-RISC platform without having to re-code the portions of the application that manipulate the data in little endian format.

FIG. 1 illustrates how data is loaded from memory into a register in big endian format. Memory map 10 shows an example of data stored in memory. Bytes a, b, c, d, e, f, g, and h are stored at memory locations 0, 1, 2, 3, 4, 5, 6, and 7, respectively. Instruction 12 is a "load byte" instruction that loads the byte at memory location 1 into register 14. Accordingly, byte b is stored in bit positions 24–31 of register 14. Instruction 16 is a "load half-word" instruction that loads two bytes starting at location 2 into register 18. Accordingly, byte c is loaded into bit positions 16–23 of register 18, and byte d is loaded into bit positions 24–31 of register 18. Instruction 20 is a "load word" instruction that loads four bytes starting at location 4 into register 22. Accordingly, byte e is loaded into bit position 0–7 of register 22, byte f is loaded into bitpositions 8–15 of register 22, byte g is loaded into bit position 16–23 of register 22, and by is loaded into bit positions 24–31 of register 22. Finally, instruction 24 is a "floating point load double-word" instructions that loads 8 bytes starting at location 0 into register 26. Accordingly, byte a is loaded into bit positions 0–7 of register 26, byte b is loaded into bit positions 8–15 of register 26, byte c is loaded into bit positions 16–23 of register 26, byte d is loaded into bit positions 24–31 of register 26, byte e is loaded into bit positions 32–39 of register 26, byte f is loaded into bit positions 40–47 of register 26, byte g is loaded into bit positions 48–55 of register 26, and byte h is loaded into bit positions 56–63 of register 26.

In contrast, FIG. 2 illustrates how data is loaded from memory into a register in little endian format. Memory map 10 is the same memory map 10 shown in FIG. 1. Instruction 28 is a "load byte" instruction that loads the byte at memory location 1 into register 30. Accordingly, byte b is stored in bit positions 24–31 of register 30, which is the same as big endian format. Instruction 32 is a "load half-word" instruction that loads two bytes starting at location 2 into register 34. Accordingly, in little endian byte d is loaded into bit positions 16–23 of register 34, and byte c is loaded into bit positions 24–31 of register 34. Instruction 36 is a "load word" instruction that loads four bytes starting at location 4 into register 38. Accordingly, in little endian format byte h is loaded into bit position 0–7 of register 38, byte g is loaded into bit positions 8–15 of register 38, byte f is loaded into bit position 16–23 of register 38, and byte e is loaded into bit positions 24–31 of register 38. Finally, instruction 40 is a "floating point load double-word" instructions that loads 8 bytes starting at location 0 into register 42. Accordingly, in little endian format byte h is loaded into bit positions 0–7 of register 42, byte g is loaded into bit positions 8–15 of register 42, byte f is loaded into bit positions 16–23 of register 42, byte e is loaded into bit positions 24–31 of register 42, byte d is loaded into bit positions 32–39 of register 42, byte c is loaded into bit positions 40–47 of register 42, byte b is loaded into bit positions 48–55 of register 42, and byte a is loaded into bit positions 56–63 of register 42.

As mentioned above, the E-bit also affects instruction fetching. PA-RISC instructions are four bytes (or alternatively, 32-bits) wide, so the state of the E-bit affects instruction fetching in a manner similar to the "load word" instructions shown in FIGS. 1 and 2. When the E-bit is 0, instruction fetch is big endian and the lower addressed bytes in memory correspond to the higher-order bytes in the instruction. When the E-bit is 1, instruction fetch is little endian and the lower-addressed bytes in memory correspond to the lower-order bytes in the instruction.

Architecturally, the instruction byte swapping can occur either when a cache line is moved into the instruction cache or as instructions are fetched from the instruction cache into the pipeline. Because PA-RISC processors are allowed to swap instructions as they are moved into the instruction cache, software is required to keep track of which pages might have been brought into the instruction cache in big endian form and in little endian form. Before executing code, all instruction cache lines of any page that might have been moved into the instruction cache in the wrong form must be flushed from the instruction cache.

One unique aspect of PA-RISC instruction encodings is that an instruction that is valid in big endian mode, may be a different valid instruction in little endian mode. For example, the following PA-RISC instructions having encodings that are valid in both modes:

| Big Endian Mode | Little Endian Mode |
|---|---|
| b,n .+0xdc | addb, tr rl, r16, .+0x7c |
| addi 4, r0 ,r0 | comclr r0, r0, r21 |
| add r31, r9, r9 | addco, <> r6, r0, r9 |
| rsm 0x1f, r0 | stb r14, 3968 (r0) |
| 1dil 1%0xdead1000, r1 | zdep, = r11, 30, 32, r15 |
| 1di 26,0 | 1di 26,0 |

Note that the encoding of the last instruction "ldi 26,0" is the same in both little and big endian modes. In other words, this instruction is "palindromic". The fact that some instructions are valid in both modes makes it very hard to verify that the processor is functioning properly when switching dynamically between endian modes

SUMMARY OF THE INVENTION

The present invention is a method for verifying that a processor is executing instructions in a proper endian mode when the endian mode is changed dynamically. In accordance with the present invention, a test suite written and compiled in big endian mode is loaded into memory. The test suite is converted to little endian mode and stored back to memory. Next, the processor status is changed from big endian mode to little endian mode, and the test suite is executed. Finally, the results of the test suite are examined to ensure that the processor properly executed the instructions in little endian mode.

The present invention serves as an important test in a large test suite designed to verify that a particular processor properly implements certain aspects of a computer architecture definition, and is applicable to any test method wherein a processor can execute in more than one mode, and the execution mode is linked to the manner in which programs and data are stored in memory.

DETAILED DESCRIPTION OF THE PREFERRED EMBODIMENTS

The present invention is a method for verifying that a processor is executing instructions in a proper endian mode when the endian mode is changed dynamically. The present invention is especially useful during the design phase of a processor to ensure the integrity of the processor design.

Figure 1:
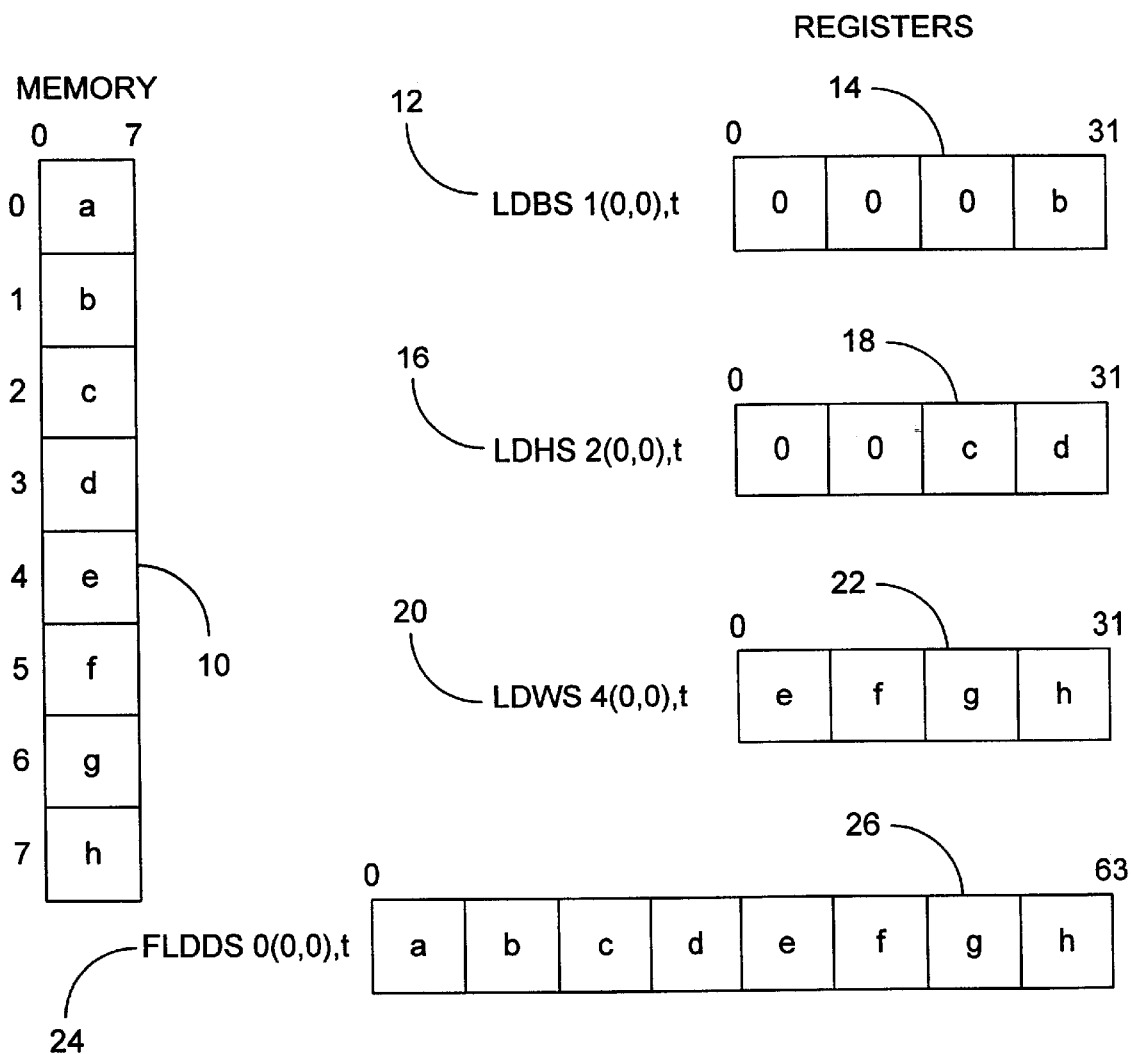
FIG. 1 is a prior art diagram illustrating how data is loaded from memory into a register in big endian format in accordance with the Hewlett-Packard PA-RISC architecture.
Figure 2:
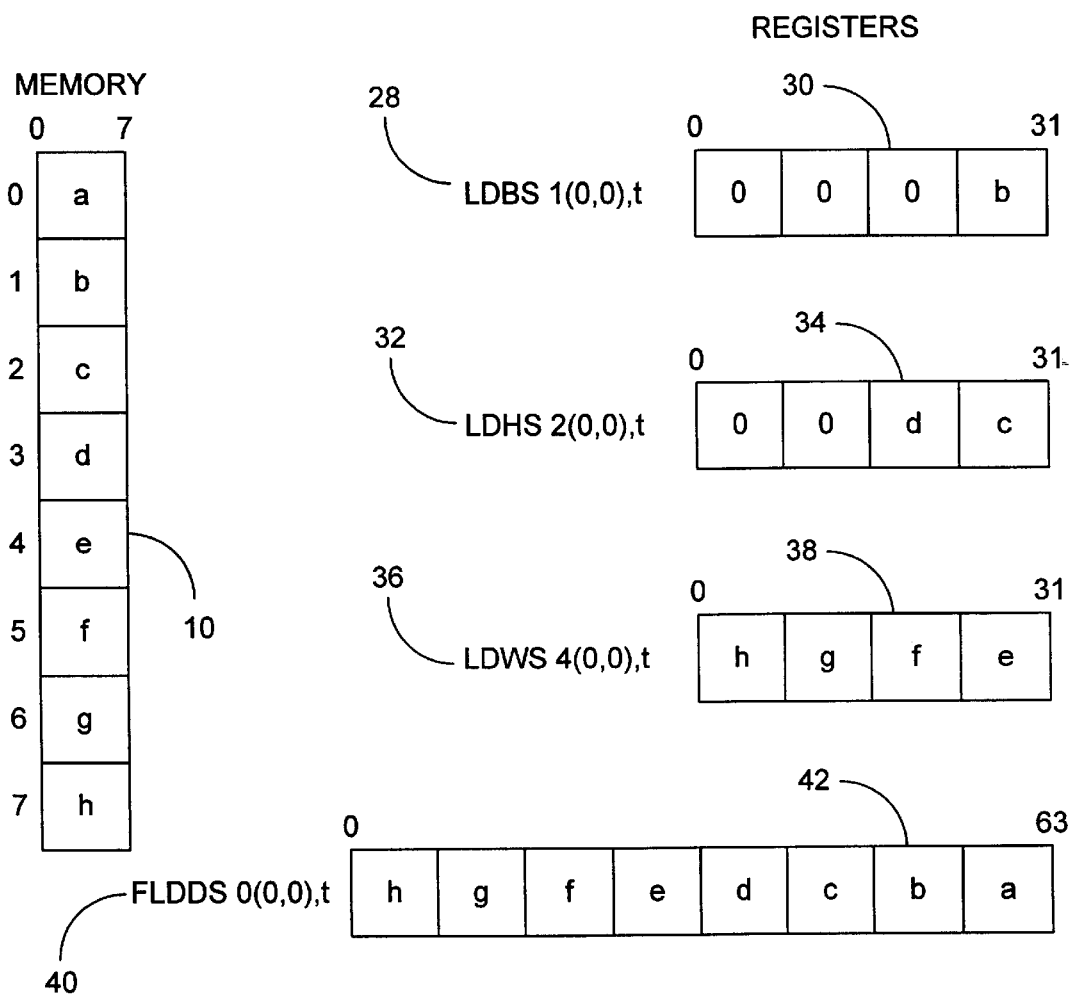
FIG. 2 is a prior art diagram illustrating how data is loaded from memory into a register in little endian format in accordance with the Hewlett-Packard PA-RISC architecture.
Figure 3:
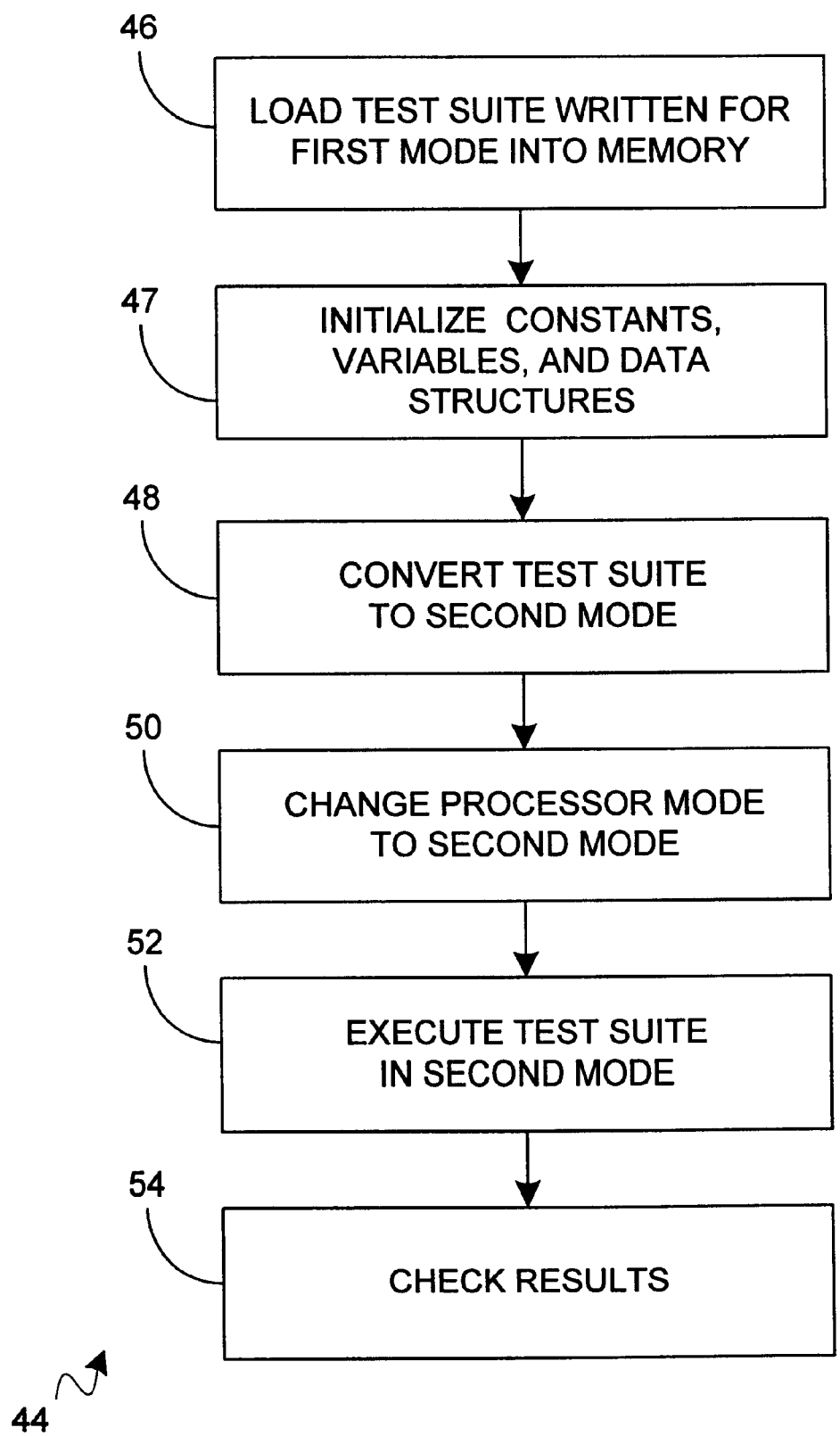
FIG. 3 is a flowchart that illustrates the method of the present invention.

FIG. 3 is a flowchart 44 that illustrates the present invention. At block 46, a test suite written and compiled for a first mode (such as big endian) is loaded into memory. At block 47, constants, variables, and data structures of the program are initialized. At block 48, the test suite is converted in memory from the first mode (such as big endian) to the second mode (such as little endian). At block 50 the processor mode is changed from the first mode (such as big endian) to the second mode (such as little endian) At block 50, the test suite is executed in the second mode (such as little endian). Finally, at block 54 the results are checked to ensure that the test suite executed properly in the second mode (such as little endian).

An assembly language program written in PA-RISC 1.1 and 2.0 instructions is incorporated herein by reference above as a Computer Program Listing Appendix. The Computer Program Listing Appendix is included on two copies of a compact disc in accordance with 37 CFR §1.96(c)(2). Each compact disc is labeled as follow: "Ser. No.: 09/183, 572", "Filed: Oct. 30, 1998", "TITLE: Method for Verifying That a Processor Is Executing Instructions in a Proper Endian Mode When the Endian Mode Is Changed Dynamically", "Created: Feb. 13, 2001", "Inventors: Vishal Malik. Alejandro Quiroz, Martin J. Whittaker, James M. Hull, Michael R. Morrell." The first copy is labeled "Copy 1 of 2" and the second copy is labeled "Copy 2 of 2". Each compact disc includes a single file having a filename of "APPENDIX.TXT", which was created on Feb. 13, 2001 at 9:06 AM and has a file size of 53,216 bytes. The program comprises program lines 1–1311. Although the program will not be explained in detail, a more detailed discussion of FIG. 3 will follow with reference to the program lines of the program. One skilled in the art will recognize additional details of the present invention by reviewing the program included in the appendix.

As noted above, block 46 loads the test suite written for the first mode into memory. Accordingly, the program included in the appendix is compiled in big endian mode.

Block 47 initializes the constants, variables, and data structures of the program. This is accomplished by lines 1–205 of the program. Note that the program is capable of executing in a real addressing mode and a virtual addressing mode, and is capable of executing on a computer system adhering to either the PA-RISC 1.1 or 2.0 architecture. Therefore, appropriate compiler directives in the program source code direct the compiler to compile the program to execute in the desired addressing mode and on a platform adhering to the desired version of the architecture.

Block 48 converts the test suite from big endian mode to little endian mode. This is accomplished by lines 206–247 of the program. Specifically, lines 210–227 perform the actual swapping of program code bytes from big endian to little endian, and lines 229–243 ensure that the modified code is flushed back from the data cache to main memory.

Block 50 changes the E-bit of the processor status word from big endian mode to little endian mode. The program accomplishes this at lines 274–291, where registers that define the processor status word contents after an interrupt and the target memory location to execute after an interrupt are loaded with appropriate values. At line 291, an RFI instruction executes a return from interrupt, which switches the processor to little endian mode and begins executing the test suite.

Block 52 executes the test suite in little endian mode. This is accomplished by the program at lines 297–1311. The test suite includes three main test segments. The first test segment tests all of the load instructions using four different data patterns. The second test segment tests all load and clear word indexed instructions with four different data patterns. The results of the first and second test segments are compared against known correct results. The third test segment tests all of the store instructions by storing data into a common location and then loading the results back into the processor. Because the load instructions have been previously tested by the first and second test segments, any discrepancies can be attributed to incorrect execution of the store instructions.

Note that block 54 checks the results and is symbolically shown at the end of flow chart 54. However, result checking is also performed within each test segment, as described above.

The present invention provides a mechanism that verifies that a processor is executing instructions in a proper endian mode when the endian mode is changed dynamically. Accordingly, the present invention serves as an important test in a large test suite designed to verify that a particular processor properly implements certain aspects of a computer architecture definition. Although the present invention has been discussed with reference to verifying the proper operation of an endian mode, the concepts disclosed herein are applicable to any test method wherein a processor can execute in more than one mode, and the execution mode is linked to the manner in which programs and data are stored in memory.

Although the present invention has been described with reference to preferred embodiments, workers skilled in the art will recognize that changes may be made in form and detail without departing from the spirit and scope of the invention.

What is claimed is:

1. A method for verifying that a processor is executing instructions properly when a mode of a processor is dynamically changed comprising:

loading a test suite written and compiled for a first mode into memory;

converting the test suite stored in memory from the first mode to a second mode;

changing a mode of the processor from the first mode to the second mode;

executing the test suite in the second mode; and checking the results of the test suite to ensure that the processor correctly executed the test suite in the second mode.

2. The method of claim 1 wherein the first mode is a big endian mode and the second mode is a little endian mode.

3. A program storage medium readable by a computer, tangibly embodying program instructions executable by the computer to implement a method for verifying that a processor is executing instructions properly when a mode of a processor is dynamically changed comprising:

a first segment of the computer readable program code for loading a test suite written for a first mode into memory;

a second segment of the computer readable program code for converting the test suite stored in memory from the first mode to a second mode;

a third segment of the computer readable program code for changing a mode of the processor from the first mode to the second mode;

a fourth segment of the computer readable program code for executing the test suite in the second mode; and a fifth segment of the computer readable program code for checking the results of the test suite to ensure that the processor correctly executed the test suite in the second mode.

4. The program storage medium of claim 3 wherein the first mode is a big endian mode and the second mode is a little endian mode.

* * * * *